United States Patent [19]

Niessen et al.

[11] Patent Number: 5,072,357

[45] Date of Patent: Dec. 10, 1991

[54] AUTOMATIC RESET CIRCUIT FOR INTEGRAL CONTROL

[76] Inventors: Frank R. Niessen, 113 Conklin Rd., Stafford Springs, Conn. 06076; Joseph M. Kos, 5 Lynn Ann Dr., Holyoke, Mass. 01040

[21] Appl. No.: 488,918

[22] Filed: Mar. 5, 1990

[51] Int. Cl.$^5$ .............................................. G05B 13/02
[52] U.S. Cl. .................................. 364/161; 364/157; 318/609
[58] Field of Search ...................... 364/157, 161, 183; 318/609, 610

[56] References Cited

U.S. PATENT DOCUMENTS

| | | | |
|---|---|---|---|
| 4,008,386 | 2/1977 | Ross | 318/610 |
| 4,096,562 | 6/1978 | Linz | 364/153 |
| 4,675,804 | 6/1987 | Wiemer | 318/609 |
| 4,718,012 | 1/1988 | Oshiage | 364/161 |

Primary Examiner—Jerry Smith
Assistant Examiner—Patrick Muir
Attorney, Agent, or Firm—RIchard H. Kosakowski

[57] ABSTRACT

An automatic control system includes a multiplier for multiplying the error signal fed to an integrator in accordance with the state of the integrator. The multiplier multiplies the error signal by a unity gain factor over the normal range of integral control; whereas, the multiplier multiplies the error signal by a factor greater than one, typically ten, when the integrator output is saturated at either the minimum or maximum values. The high multiplication value of the error signal ensures a sufficiently quick recovery from an integrator saturation condition.

6 Claims, 2 Drawing Sheets

AUTOMATIC RESET CIRCUIT FOR INTEGRAL CONTROL

DESCRIPTION

1. Technical Field

This invention relates to automatic control systems, and more particularly to such a control system having an integrator for providing integral control of a process variable and having an integrator automatic reset circuit associated therewith for improved integral control.

2. Background Art

Integral control is often used in automatic control systems, particularly where steady state accuracy is very important. This is because integrators have very high gain at low frequencies; thus, an integrator can eliminate the steady state error in a closed loop control application.

While an integrator is actively nulling the error, its output automatically adjusts to the proper level for each particular operating condition. However, an operating condition may exist where the error cannot be nulled. When this occurs, the integrator output becomes saturated. That is, the error signal will cause the integrator output to be set at either its minimum or maximum output limits. Then when the operating condition changes such that the integrator is again capable of nulling the error, it is desired that the integrator output quickly return to the proper level required for the new operating condition.

The automatic control system is usually designed such that, under all possible situations, its output is capable of driving the process over its entire range. This typically results in a loss of effectiveness of the control output in the vicinity of its minimum and maximum values.

When the integrator is recovering from a saturated condition, there is a delay due to the time required for the integrator output to travel across the ineffective range from either the minimum or maximum output valves. This delay can cause unacceptably large errors in the control of the process.

The above situation can be further aggravated by a high process gain, which necessitates the selection of a low gain for the integrator in order to achieve acceptable closed loop stability. Thus, for a given error signal, the delay described above becomes even greater when a lower gain must be utilized for the integrator.

DISCLOSURE OF INVENTION

An object of the present invention is to reduce the time taken by an integrator in an automatic control system to come out of a saturation condition. Another object is to reduce the transient error which occurs when process control is resumed following saturation of the integrator.

According to the present invention, an automatic control system having an integrator for providing for integral control of a process variable includes a multiplier inserted in the control path prior to the integrator, the multiplier being used to multiply an error signal generated by the control system before being input to the integrator, the value of the multiplier being equal to a multiplication factor whose value is established by hysteresis logic connected to the integrator output, during normal control when the integrator is able to keep the error nulled the hysteresis logic establishes the multiplication factor at a value of unity, whereas when the integrator saturates the hysteresis logic establishes the multiplication factor at a value greater than one thereby providing for a rapid recovery of the integrator out of the saturation condition.

The invention has utility by decreasing the time it takes for the integrator to come out of a saturation condition by the use of a high gain multiplier of the error signal. By reducing this time, the invention reduces the risk of unacceptably large errors occurring in the control of the process variable. Also, switching back to a low multiplier gain of the error signal when the integrator comes out of saturation results in acceptable closed loop stability.

Other objects, features, and advantages of the present invention will become more apparent from the following detailed description of a best mode embodiment thereof, as illustrated in the accompanying drawings.

BEST MODE FOR CARRYING OUT THE INVENTION

Figure 1:
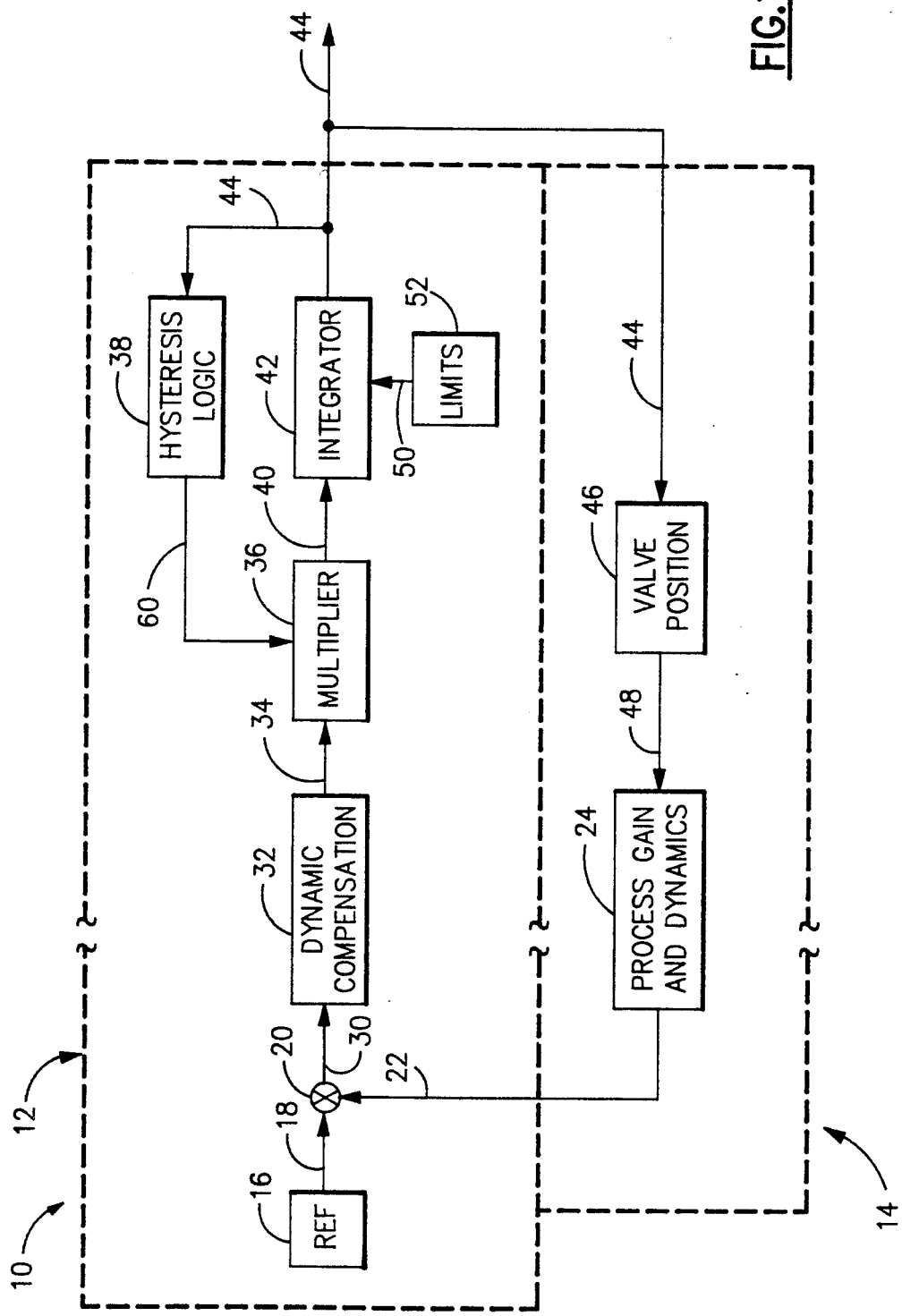
FIG. 1 is a block diagram of an automatic control system including the control apparatus of the present invention and the system to be controlled.

FIG. 1, illustrates a block diagram of a portion of an automatic control system 10 used for achieving control of a desired process variable. Included as part of the control system is a controller portion 12 and a portion 14 indicating the system to be controlled. In an exemplary embodiment, the process variable to be controlled is temperature. The controller may comprise the temperature control portion of, e.g., a Model EC66A Digital Environmental Control provided by Hamilton Standard. The process variable is controlled by modulating the position of a valve.

Typically a reference block 16 generates a reference signal on a line 18 indicative of a desired temperature. The reference signal may be generated in a manner which should be readily apparent to one skilled in the art of control theory. The reference signal is fed to one input of a summing junction 20. The other input of the summing junction 20 is fed on a line 22 from a block 24 indicative of process gain and dynamics of the process temperature. The output of this block on the line 22 is indicative of the sensed temperature.

The summing junction output signal on a line 30 is indicative of the error between the reference signal and the sensed signal and is fed to a block 32 which provides dynamic compensation of the error signal. The output of this block 32 on a line 34 is fed to a multiplier 36. As will be seen hereinafter, the multiplier 36 multiplies the error signal in accordance with a multiplication factor provided by hysteresis logic 38 of the present invention.

The output of the multiplier is fed on a line 40 to a control integrator 42, which integrates the error signal over time. The output of the integrator 42 on a line 44 is used as a control signal to control the process variable. The integrator output comprises a signal which is a function of the history of the error signal. Thus, the integrator output is maintained at a new level after the error is nulled following a disturbance in the control system. A desirable feature of an integral control is its ability to eliminate the droop or offset caused by load changes.

the integrator output on the line 44 is fed to a block 46 which determines valve position from the controller output. FIG. 2(b) illustrates a graph of nominal valve position versus controller output. Depending on hardware tolerances and varying operating conditions, the actual valve position versus controller output characteristic may have either a lesser or greater slope and may also be shifted with respect to controller output. Because of this, the full controller output range of 0% to 100% must be maintained. The resulting valve position signal is provided on a line 48 to the aforementioned process gain and dynamics block 24.

Typically provided to the integrator 42 are limit signals on a line 50 from a limit block 52, which limit the integrator output at, e.g., 0 and 100% of the integrated output value.

The integrator output on the line 44 is also fed to the hysteresis logic 38, in accordance with the present invention. Illustrated in FIG. 2(a) is a graph of hysteresis logic output (i.e., multiplication factor) versus controller output. The hysteresis logic operates such that for values between, e.g., 10% and 90% of the controller output, the multiplication factor provided by the hysteresis logic on a line 60 to the multiplier 36 is typically a value of one. For controller output values either less than 10% or greater than 90% of full scale controller output, the hysteresis logic establishes the value of the multiplication factor at a value greater than one, e.g., ten.

Figure 2:
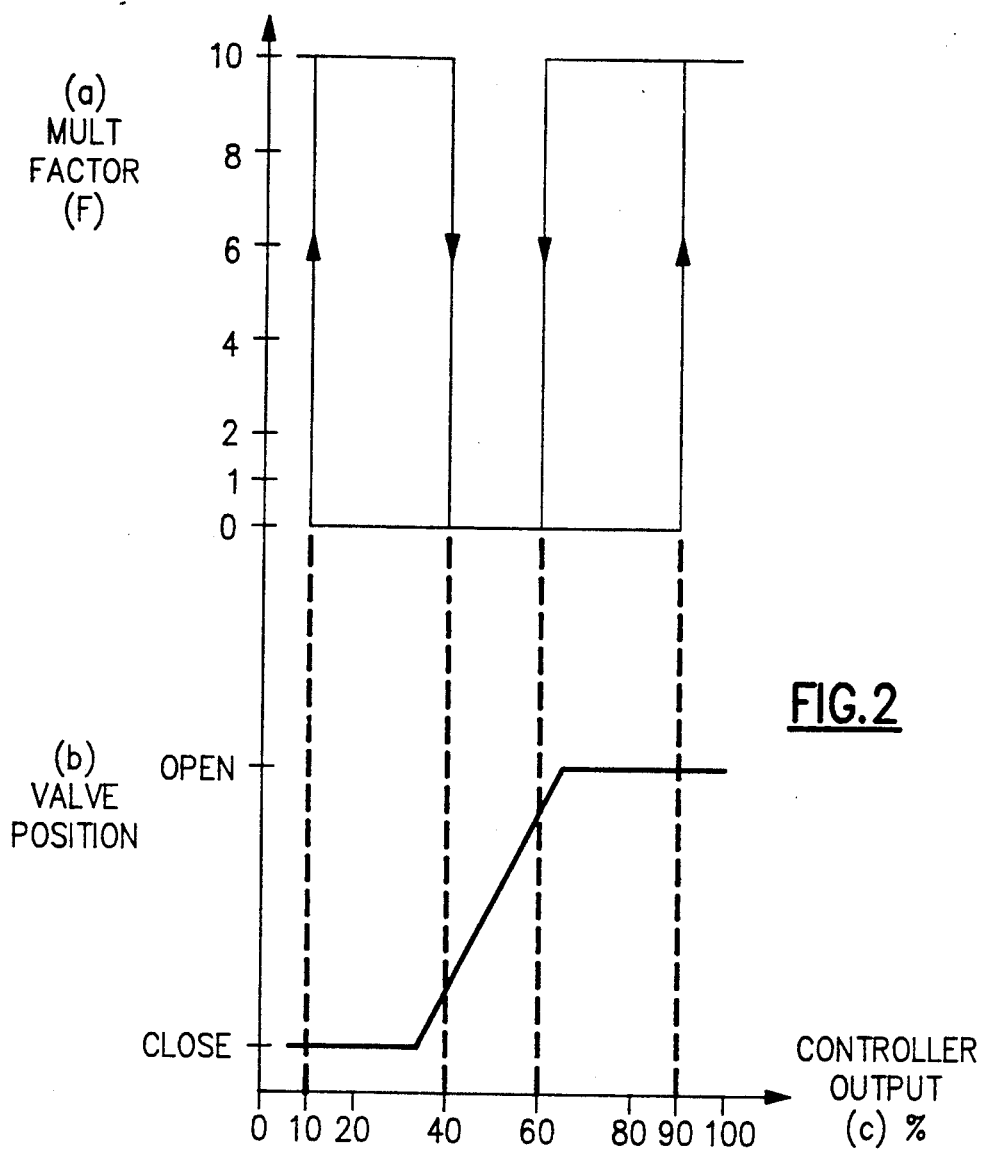
FIG. 2, illustrates a functional graph of the hysteresis logic of the present invention together with a corresponding graph of the process variable to be controlled.

Thus, as can be seen from FIG. 2, the hysteresis logic establishes the value of the multiplication factor based on the controller output. During normal control when the integrator 42 keeps the error signal nulled, the multiplication factor equals one. This low value ensures an acceptable closed loop stability for the automatic control system 10. When the integrator becomes saturated, as indicated by being outside the range bounded by, e.g., 10% and 90% of full scale controller output, the multiplication factor equals ten.

After the operating condition changes and drives the integrator away from the saturated condition, the integrator will return quickly to its effective control range by means of the multiplication factor being equal to ten. Then as soon as the controller output is within the range bounded by, e.g., 40% and 60% of the controller output, the hysteresis logic again sets the multiplication factor equal to one so that normal control may again be resumed. The strategy of the hysteresis logic of the present invention results in a reduction of the transient error which occurs when process control is resumed following saturation of the integrator. This reduction in transient error is over that associated with a typical prior art embodiment of an integrator which does not have the hysteresis logic 38 and multiplier 36 of the present invention associated therewith.

Figure 3:
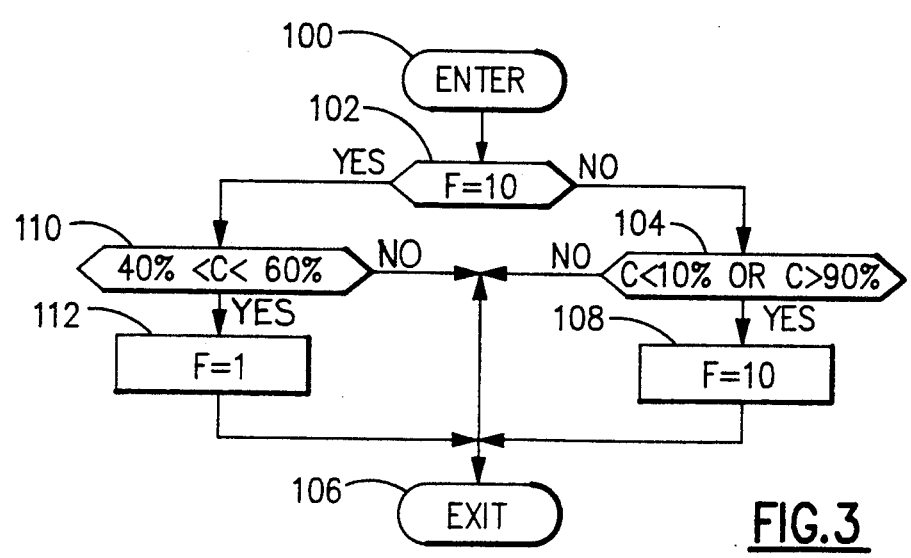
FIG. 3, -illustrates a flow chart of steps executed by an automatic control system in implementing the hysteresis logic of the present invention.

FIG. 3 illustrates a flow chart executed by a digital microprocessor (UPROC) embodiment of an automatic control system in carrying out the hysteresis logic of the present invention. This flow chart may be executed as part of an overall control strategy for the automatic control system in effectuating control of one or more process control variables in a manner which should be readily apparent to one skilled in the art of control theory.

After an enter step 100 in FIG. 3, the UPROC checks, in a test 102, if the multiplication factor (F) equals ten. If not, the UPROC checks, in a test 104, for a value of controller output (C) either less than 10% or greater than 90% of full scale controller output. If the controller output is neither less than 10% nor greater than 90% full scale controller output, the UPROC returns in a step 106. If the controller output is either less than 10% or greater than 90% of full scale controller output (i.e., an integrator saturation condition), the UPROC sets the multiplication factor equal to ten in a step 108, and the subroutine exits in the step 106.

If, as a result of the check for the multiplication factor equal to ten in the test 102, the multiplication factor does indeed equal ten, the UPROC checks, in a test 110, if the controller output is within the range bounded by 40% to 60% of full scale controller output. If the controller output is not within this range, the subroutine exits in the step 106. This is indicative of the fact that the integrator is still recovering from saturation. If the controller output is between 40% and 60% of full scale controller output, the UPROC sets the value of the multiplication factor equal to one in a step 112, which indicates that the integrator has recovered from saturation and normal control is to be resumed. The subroutine then exits in the step 106.

As illustrated, the hysteresis logic of the present invention may be implemented in a suitable computing means (e.g., a microprocessor such as the well-known model Z80 from Zilog) embodied within an automatic control system by way of relatively simple program steps, utilizing only apparatus and techniques which are readily available and well known in the art in light of the teachings presented herein. However, the invention may be implemented in an automatic control system by means of dedicated digital and/or analog hardware in a manner which should be apparent to one skilled in the art.

It is to be understood that the controller output values of 10% and 90% for determining integrator saturation, and the 40% and 60% values for determining when the integrator has come out of saturation, are purely exemplary. Any values consistent with an implementation of hysteresis may be used, if desired, in light of the teachings of the typical hysteresis-shape graph of FIG. 2(a) herein. Also, the values for the multiplication factor taught herein are also purely exemplary. Typically, the error signal is input with unity gain to the integrator during normal integrator control. However, when the integrator is in saturation, values of the multiplication factor other than ten may be used in order to reduce the time taken by the integrator to come out of saturation. The particular value chosen will depend upon the dynamics of the closed loop together with a desired response time for the integrator to come out of saturation.

The invention has been described for use in an automatic control system which is operable to control temperature by means of a valve. However, it is to be understood that the present invention may be used within an automatic control system which is operable to control any type of desired process control variable. It suffice that the automatic control system have an integrator for providing for integral control of a process variable and having a multiplier inserted in the control path prior the integrator, the multiplier being used to multiply an error signal generated by the control system before being input to the integrator, the value of the multiplier being equal to a multiplication factor whose value is established by hysteresis logic connected to the integrator output, during normal control when the integrator is able to keep the error nulled the hysteresis logic establishes the multiplication factor at a value of unity, whereas when the integrator saturates the hysteresis logic establishes the multiplication factor at a value greater the one thereby providing for a rapid recovery of the integrator out of the saturation condition.

Although the invention has been shown and described with respect to a best mode embodiments thereof, it will be understood by those skilled in the art that the foregoing and various other changes, omissions, and addition in the form and detail thereof may be made without departing from the spirit and scope of the claimed invention.

We claim:

1. A process control system, comprising:
   means, for generating a signal indicative of an actual value of a selected process variable;
   reference means, for generating a reference signal indicative of a desired value of said selected process variable;
   summing means, for comparing said actual value of said selected process variable with said desired value of said selected process variable, and for generating an error signal indicative of any difference therebetween;
   integrating means, for providing a control signal operative to modify the process so as to drive said actual value of said selected process variable towards said desired value of said selected process variable;
   characterized by:
   reset means, responsive to said control signal, for multiplying said error signal by a value of one when the value of said control signal is between first minimum and maximum limit values and for providing a multiplied error signal in accordance therewith, said control signal between said first minimum and maximum limit values being indicative of normal integrator control action, said reset means further comprising means for multiplying said error signal by a value greater than one when the value of said control signal is either greater than said first maximum limit value or less than said first minimum limit value and for providing said multiplied error signal in accordance therewith, said control signal either greater than said first maximum limit value or less than said first minimum limit value being indicative of an integrator saturation condition, said integrating means further comprising means operable for integrating said multiplied error signal with respect to time and for providing said control signal in accordance therewith.

2. The process control system of claim 1, wherein said reset means comprises:
   hysteresis logic means, responsive to said control signal, for generating a factor signal with a value equal to one when said control signal is between said first minimum and maximum limit values and when a most recent value of said factor signal is equal to one; and
   multiplier means, for multiplying said error signal in accordance with said factor signal and for providing said multiplied error signal indicative thereof.

3. The process control system of claim 2, wherein said hysteresis logic means further comprises means for generating said factor signal with a value greater than one when the value of said control signal is either greater than said first maximum limit value or less than said first minimum limit value and when a most recent value of said factor signal is equal to one.

4. The process control system of claim 3, wherein said hysteresis logic means further comprises means for generating said factor signal with a value greater than one when the value of said control signal is greater than a second maximum limit value and when a most recent value of said factor signal is greater than one, or when the value of said control signal is less than a second minimum limit value and when a most recent value of said factor signal is greater than one.

5. The process control system of claim 4, wherein said hysteresis logic means further comprises means for generating said factor signal having a value equal to one when said control signal is between said second minimum and maximum limit values and when a most recent value of said factor signal is greater than one.

6. A process control system, which has an error signal indicative of any difference between an actual value of a selected process variable and a desired value of the selected process variable, comprising:
   integrating means, for integrating the error signal with respect to time and for providing a control signal in accordance therewith and operative to modify the process so as to drive the actual value of the selected process variable towards the desired value of the selected process variable; characterized by:
   multiplier means, for multiplying the error signal in accordance with a factor signal; and
   hysteresis logic means, responsive to said control signal, for generating said factor signal with a value equal to one when said control signal is between first minimum and maximum limit values and when a most recent value of said factor signal equals one, for generating said factor signal with a value greater than one when the value of said control signal is either greater than said first maximum limit value or less than said first minimum limit value and when a most recent value of said factor signal equals one, for generating said factor signal with a value greater than one when the value of said control signal is greater than a second maximum limit value and when a most recent value of said factor signal is greater than one or when the value of said control signal is less than a second minimum limit value and when a most recent value of said factor signal is greater than one, and for generating said factor signal with a value equal to one when said control signal is between said second minimum and maximum limit values and when a most recent value of said factor signal is greater than one.

* * * * *

UNITED STATES PATENT AND TRADEMARK OFFICE
CERTIFICATE OF CORRECTION

PATENT NO. : 5,072,357
DATED : December 10, 1991
INVENTOR(S) : Frank R. Niessen and Joseph M. Kos It is certified that error appears in the above-identified patent and that said Letters Patent is hereby corrected as shown below:

Title page, "Attorney, Agent, or Firm" RIchard should be --Richard--.

Signed and Sealed this

First Day of June, 1993

Attest:

MICHAEL K. KIRK

Attesting Officer

Acting Commissioner of Patents and Trademarks